US007933314B2

(12) United States Patent
Lindoff

(10) Patent No.: US 7,933,314 B2
(45) Date of Patent: Apr. 26, 2011

(54) METHOD AND APPARATUS FOR COMMUNICATION RECEIVER DESPREADING RESOURCE MANAGEMENT

(75) Inventor: Bengt Lindoff, Bjärred (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1331 days.

(21) Appl. No.: 11/472,770

(22) Filed: Jun. 22, 2006

(65) Prior Publication Data
US 2007/0297494 A1 Dec. 27, 2007

(51) Int. Cl.
*H04B 1/00* (2006.01)
(52) U.S. Cl. .................. 375/148; 375/267; 375/147
(58) Field of Classification Search .................. 375/148, 375/267
See application file for complete search history.

(56) References Cited

U.S. PATENT DOCUMENTS

| | | | |
|---|---|---|---|
| 6,347,234 B1 * | 2/2002 | Scherzer | 455/562.1 |
| 7,142,586 B2 * | 11/2006 | Reial | 375/148 |
| 2002/0181628 A1 | 12/2002 | Iochi et al. | |
| 2002/0196871 A1 | 12/2002 | Nishio et al. | |
| 2004/0219959 A1 | 11/2004 | Khayrallah et al. | |

FOREIGN PATENT DOCUMENTS
WO WO 2004/084431 A1 9/2004

OTHER PUBLICATIONS

Cairns, D., Fulghum, T. and Bexten, R., "Experimental Evaluation of Interference Cancellation for Dual-Antenna UMTS Handset." Proceedings of IEEE $62^{nd}$ Vehicular Technology Conference (VTC-2005-Fall), Sep. 25-28, 2005, pp. 877-881 vol. 2, ISSN: 1090-3038, ISBN: 0-7803-9152-7.

(Continued)

*Primary Examiner* — Chieh M Fan
*Assistant Examiner* — Santiago Garcia
(74) *Attorney, Agent, or Firm* — Coats & Bennett, P.L.L.C.

(57) ABSTRACT

According to a method taught herein, a multi-branch communication receiver operates in a first mode wherein it despreads individual receiver branch signals with respect to all channelization codes of interest, if sufficient despreader resources are available for such operation. If the receiver estimates that sufficient despreader resources are not available, it operates in a second mode wherein it despreads one or more of the channelization codes from a branch combination signal formed from two or more of the receiver branch signals. The receiver may calculate optimal branch combining weights using an algorithm that maximizes a signal quality of the branch combination signal. A Generalized RAKE (GRAKE) receiver embodiment applies GRAKE detection to the individual receiver branch signals with respect to all channelization codes of interest if sufficient despreader resources are available and, if not, applies GRAKE detection to the branch combination signal for one or more such codes.

23 Claims, 5 Drawing Sheets

U.S. PATENT DOCUMENTS

| | | | |
|---|---|---|---|
| 2004/0223539 A1* | 11/2004 | Yang | 375/148 |
| 2005/0163199 A1* | 7/2005 | Wang | 375/148 |
| 2005/0195889 A1* | 9/2005 | Grant et al. | 375/148 |
| 2005/0201447 A1* | 9/2005 | Cairns et al. | 375/148 |
| 2006/0056496 A1* | 3/2006 | Smee et al. | 375/148 |
| 2006/0083292 A1* | 4/2006 | Khayrallah et al. | 375/148 |
| 2006/0120439 A1* | 6/2006 | Smee et al. | 375/148 |
| 2006/0126705 A1* | 6/2006 | Bachl et al. | 375/148 |

OTHER PUBLICATIONS

Eltawil, A. M., et. al., "Dual Antenna UMTS Mobile Station Transceiver ASIC for 2Mb/s Data Rate." Digest of Technical Papers IEEE International Solid-State Circuits Conference (ISSCC, 2003) Session 8 Communications Signal Paper 8.3, Feb. 2003, 10 pages, vol. 1, ISSN: 0193-6530, ISBN: 0-7803-7707-9, Innovics Wireless, Los Angeles, CA, USA.

Fabbryccio, A.C.M. et. al. "Performance of an Adaptive Space-Time Processing Receiver for the User Terminal of 3G WCDMA Systems under COST-259 Channel Models." Proceeding of IEEE 56$^{th}$ Vehicular Technology Conference (VTC 2002-Fall, Sep. 24-28, 2002, pp. 57-61, vol. 1, ISSN: 1090-3038, ISBN: 0-7803-7467-3.

Harju, et al., "A Flexible Rake Receiver Architecture for WCDMA Mobile Terminals," Third IEEE Signal Processing Workshop on Signal Processing Advances in Wireless Communications, Mar. 20-23, 2001, pp. 9-12, Taoyuan, Taiwan, XP10542258A.

\* cited by examiner

METHOD AND APPARATUS FOR COMMUNICATION RECEIVER DESPREADING RESOURCE MANAGEMENT

TECHNICAL FIELD

The present invention generally relates to communication systems and signals, and particularly relates to management of signal despreading resources in communication receivers.

BACKGROUND

Code-based multiplexing, such as used in Direct Sequence Code Division Multiple Access (DS-CDMA) wireless communication networks, allows for the transmission of potentially many different signals on the same frequency. In such contexts, receivers extract individual signals of interest from the "composite" received signal by correlating the composite signal with individual spreading codes used by the transmitter for those signals of interest. For example, an individual receiver recovers control, pilot, and data channel signals from the received composite signal based on despreading the composite signal using control, pilot, and data channel spreading codes.

Despreading different (code) channels at the same time requires the allocation of separate decoding resources to each channel. Simplistically, then, recovering three different code channels from a received composite signal requires three different "despreaders." In actuality, most contemporary receivers assign more than one despreader to each code channel of interest, as part of multipath signal reception operations. For example, assuming three dominant propagation paths for the received composite signal, a given RAKE-type receiver might assign three despreading "fingers" to a data code channel, for data reception on each path delay, while simultaneously assigning another three despreading fingers for decoding the pilot channel at the same three path delays. The latter assignment permits the receiver to make propagation channel estimations for each of the dominant delay paths.

While the above simple example hints at the potential need for despreading resources, a more concrete example better illustrates the point. For example, wireless communication receivers, such as mobile terminals or stations of the type used in cellular communication networks, are becoming multimedia service terminals, providing a wide range of voice, data, and entertainment services to their users. Existing and developing wireless communication standards, such as the current and forthcoming releases of the 3GPP WCDMA standards, recognize and provide for these types of services. Particularly, the developing WCDMA standards provide support for video and medium-rate data (300 Kbs) (defined in Release 99), High Speed Packet Access (HSPA) service (defined in Releases 5/6) for high data rates (up to 4 Mbs on the uplink and up to 14 Mbs on the downlink). Other examples of rich, multimedia services transmission scenarios include those associated with the Multi-cast/Broadcast Multimedia Services (MBMS) defined in the Release 6 of the 3GPP standards.

Typically, each type of service requires at least one channelization code, meaning that one or more despreaders must be assigned to that code. Simultaneous services, along with associated control and signaling overhead, being received on multipath propagation channels thus translates into the need for a potentially large pool of despreading resources at the receiver, e.g., each code requires a dedicated despreader per each signal propagation path of interest. The requirement for potentially large numbers of individually assignable despreaders is particularly true in the context of Generalized Rake (GRAKE) receivers, which include Rake fingers operated as "probing" fingers for interference characterization, in addition to those Rake fingers dedicated to despreading the code channels of interest.

In the HSPA context, the channelization codes a given receiver is obligated to despread might include those for a Common Pilot Channel (CPICH), Broadcast Channel (BCH), Dedicated Physical Channels (DPCHs) from up to six cells, up to fifteen High Speed Packet Data Shared Channels (HS-PDSCHs), and up to four High Speed Shared Control Channels (HS-SCCH). Furthermore, a number of downlink control channelization codes for the uplink may also be needed, such as E-AGCH and E-HICH/E-RGCH. Multiplying the total number of code channels involved by the number of radio paths of interest requires a potentially large number of despreaders, e.g., likely something well in excess of 100 despreader resources per receiver branch.

The despreader resource requirements multiplicatively increase as additional receiver antennas and receiver front-ends (branches) are added, such as for diversity reception improvements. For example, if, for one receiver branch, 100 despreaders are required to despread all of the channel codes of interest at all of the propagation path delays of interest, then twice that number—i.e., 200 despreaders—generally would be required for two receiver branches.

One approach to reducing the number of individual despreaders needed relies on doing more with them. For example, increasing the speed at which the despreading process operates by a factor of two means that two code channels can be recovered from a buffered received signal by one despreader in the same amount of time needed by two despreaders operating in parallel on the signal but at half the speed. However, higher processing speed generally means higher power consumption, greater complexity, and greater expense.

Of course, the actual number of despreaders needed at any given time depends on the particular communication services being used and the prevailing radio conditions. However, because despreader resources generally represent "fixed assets" in the receiver, designing and building a receiver with fewer than the maximum number required for a worst-case scenario, compromises receiver performance, at least during worst-case conditions.

SUMMARY

According to a method and apparatus taught herein, apparatus and corresponding methods provide for the management of despreader resources in a multi-branch communication receiver in a manner that effectively optimizes receiver performance in the face of potential shortages of despreader resources. According to one embodiment of a method of despreading two or more receiver branch signals in a communication receiver, one or more processing circuits are configurable for operation in first or second modes.

In the first mode of operation, the processing circuits despread all channelization codes of interest from each of the two or more receiver branch signals, which, for example, correspond to different antenna signals. In the second mode of operation, the one or more processing circuits despread one or more of the channelization codes of interest from a branch combination signal formed from a combination of two or more receiver branch signals, rather than from each receiver branch signal. Despreading one or more of the channelization codes from the branch combination signal rather than from each of the receiver branch signals reduces despreader resource requirements. Thus, the method may include determining whether to operate in the first or second mode based on estimating whether despreader resources available in the communication receiver are sufficient to support operation in the first mode.

In one or more embodiments, the one or more processing circuits are configured to form the branch combination signal as a weighted combination of the involved individual receiver branch signals, which may or may not be fewer than all receiver branch signals. Further, in at least one embodiment, the one or more processing circuits are configured to determine the branch weighting values according to an algorithm that maximizes a signal quality of the branch combination signal. For example, despread values of the receiver branch signals may be combined according to complex weighting values, wherein the amplitudes and/or phases of the complex weighting values are determined according to an algorithm that maximizes a signal-to-noise ratio of the branch combination signal. Quantized (or reduced ranges) of the amplitudes and phases of the complex weighting values may be used to simplify the maximization algorithm.

One or more variations of the above methods and apparatus may be implemented in a Generalized RAKE receiver. For example, one embodiment of a Generalized RAKE receiver circuit performs Generalized RAKE detection in a multi-branch communication receiver by, in a first mode of operation, performing Generalized RAKE detection on individual receiver branch signals, for each channelization code of interest in a plurality of channelization codes of interest. In a second mode of operation, the GRAKE receiver circuit performs GRAKE detection on a combined branch signal formed as a weighted sum of the individual receiver branch signals, for one or more of the channelization codes of interest. In one or more embodiments, the GRAKE receiver circuit is configured to select the first or second mode of operation based on estimating a sufficiency of available despreader resources within the multi-branch communication receiver for supporting operation in the first mode.

Of course, the present invention is not limited to the above features and advantages. Indeed, those skilled in the art will recognize additional features and advantages upon reading the following detailed description, and upon viewing the accompanying drawings.

DETAILED DESCRIPTION OF EMBODIMENTS

Figure 1:
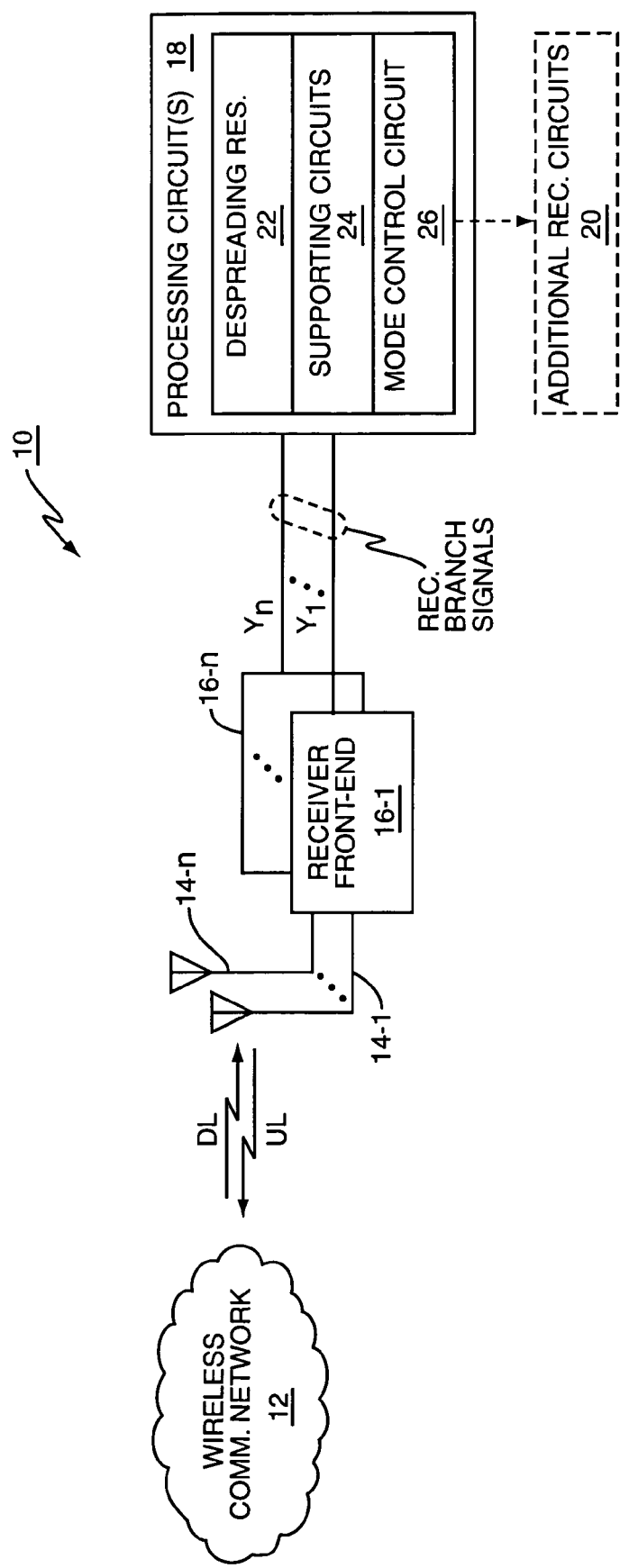
FIG. 1 is a block diagram of one embodiment of a communication receiver and a supporting communication network.

FIG. 1 at least partially illustrates one embodiment of a communication receiver 10, shown in communication with a supporting communication network 12. The communication receiver 10 is configured to manage its (received signal) despreader resources, discussed in detail later herein, in a manner that effectively optimizes receiver performance in the face of potential shortages of despreader resources.

As illustrated, the communication receiver 10 comprises two or more receiver antennas 14 (e.g., 14-1 through 14-$n$), two or more receiver "front-ends" 16 (e.g., 16-1 through 16-$n$), one or more processing circuits 18, and additional receiver circuits 20 as needed or desired in dependence on the intended use and desired functionality of the communication receiver 10. By way of non-limiting example, the communication receiver 10 may comprise a wireless communication device, such as a cellular telephone or other mobile station, and may be configured for operation in a wireless communication network. Indeed, in one or more embodiments, the communication network 12 operates in accordance with WCDMA standards, and the communication receiver 10 comprises a mobile station configured for WCDMA operation.

Whether or not the communication receiver 10 is configured for WCDMA operation, it is assumed that it receives one or more "composite" communication signals that include individual signals of interest that are recoverable from the composite signal via the use of channelization codes. For example, in one or more embodiments, the communication network 12 transmits one or more Code Division Multiple Access (CDMA) signals on the downlink (DL) to the communication receiver 10. Any number of control, data, and pilot signals of interest may be encoded in the downlink signal by spreading each signal of interest as part of transmission signal processing, using a unique channelization code. Thus, the communication receiver 10 recovers each signal of interest from the composite signal by despreading the received composite signal using the corresponding channelization codes—i.e., by correlating (despreading) the composite received signal to each channelization code of interest.

More particularly, the communication receiver 10 receives the downlink signal(s) on each of its two or more receiver antennas 14, and the corresponding receiver front-ends 16 thus provide two or more receiver branch signals (e.g., indicated as baseband signals $Y_1$ through $Y_n$), wherein each receiver branch signal generally represents a different "version" of the received composite signal, and thus exhibits different multipath fading characteristics. The availability of multiple receiver branch signals, also sometimes referred to as spatial diversity signals, provides the communication receiver 10 with an opportunity to increase its receiver performance by exploiting the redundant information contained in the receiver branch signals. That is, the communication receiver 10 can despread each receiver branch signal with respect to all channelization codes of interest, such despread values corresponding to the same channelization code can be combined or compared across multiple receiver branches.

However, the number of channelization codes that are of interest at any particular time may be significant, and despreading all such codes from each receiver branch signal, generally at multiple path delays per receiver branch signal, quickly consumes significant despreader resources. To that end, referring again to the circuit embodiments of FIG. 1, the processing circuits 18 comprise a finite number or amount of despreading resources 22, a number of supporting circuits 24, e.g., channel estimators, etc., and a mode control circuit 26 that is configured to manage the despreader resources 22. More particularly, in one or more embodiments, the mode control circuit 26 is configured to determine whether there are sufficient despreader resources 22 to despread all channelization codes of interest from each receiver branch signal, and control despreader operation accordingly.

Figure 2:
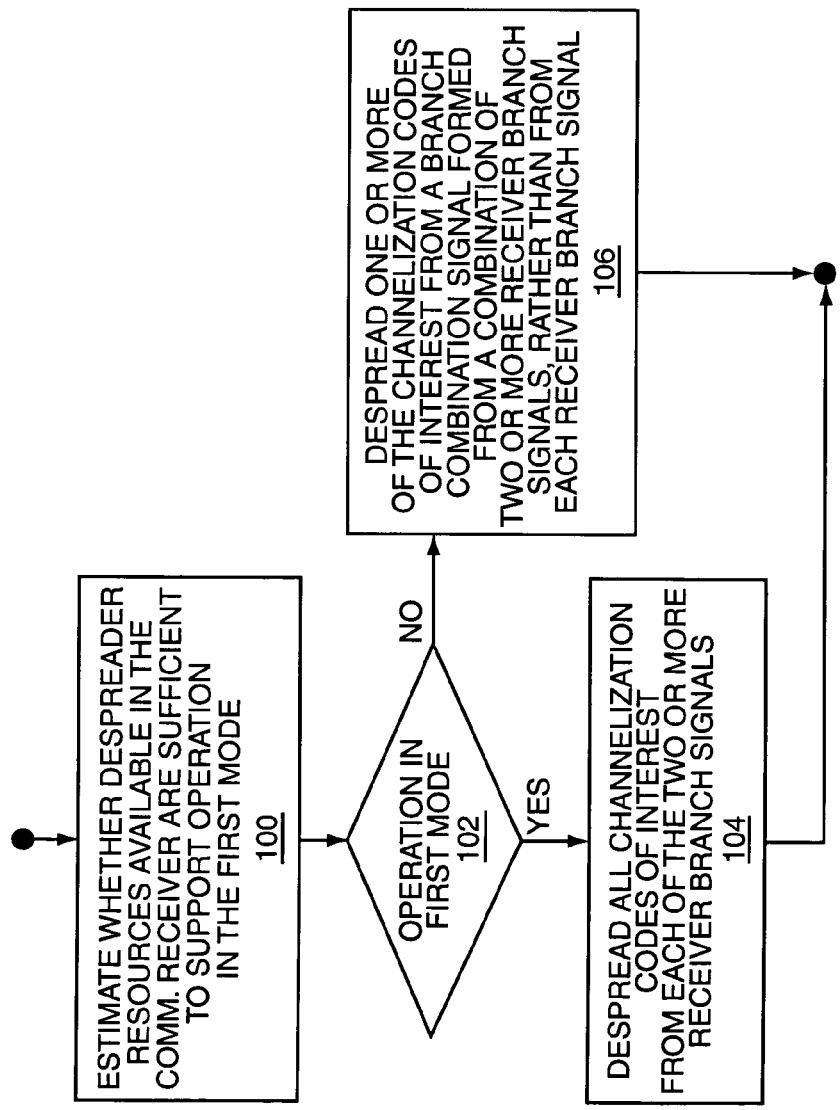
FIG. 2 is a logic flow diagram of one embodiment of processing logic for managing despreader resources in a communication receiver, according to first and second modes of operation.

FIG. 2 illustrates processing logic for one embodiment of despreader resource management. Such logic may be implemented in hardware, software, or any combination thereof. For example, the illustrated logic may comprise computer program instructions in whole or part. The processing circuits 18 may comprise, for example, a digital signal processor (DSP), microprocessor, ASIC, FPGA, or one or more other digital processing circuits. Thus, software or firmware instructions may be used to configure the processing circuits 18 for carrying out the program logic of FIG. 2.

In FIG. 2, processing "begins" with the communication receiver 10 estimating whether available despreader resources 22 are sufficient to support a first mode of operation (Step 100), wherein the processing circuits 18 are configured to despread all channelization codes of interest from each of receiver branch signals. Operating in the first mode tends to maximize performance, at least from a signal quality perspective, by fully exploiting the diversity reception afforded by having multiple receiver antennas 14 and front-ends 16, and multiple corresponding receiver branch signals.

The processing circuits 18 determine whether to operate in the first mode, based on the estimation of despreader resource sufficiency (Step 102). If sufficient despreader resources are available, the processing circuits 18 operate in the first mode. As explained, operating in the first mode means that the processing circuits 18 are configured to despread all channelization codes of interest from each of the receiver branch signals (Step 104). However, if the despreader resources 22 available within the communication receiver 10 are not deemed to be sufficient in number (or amount) to support operation in the first mode, the processing circuits 18 are configured for operation in the second mode (Step 106).

In the second mode of operation, the processing circuits 18 despread one or more of the channelization codes of interest from a branch combination signal, rather than from the individual receiver branch signals. Indeed, in at least one embodiment, the processing circuits 18 despread all channelization codes of interest from the branch combination signal, rather than from the individual branch signals, thus yielding a significant reduction in the number or amount of despreader resources needed for received signal despreading.

However, other embodiments are more strategic, based on recognizing that some control and signaling channels included in the received composite signal are more robust and/or less critical than others. For example, the modulation and coding schemes (MCS) and/or relative transmit power used for certain control channels makes such channels ideal candidates for despreading from the branch combination signal. In other words, the communication receiver 10 can achieve acceptable reception performance for such channels via the branch combination signal and the diversity reception gains afforded by despreading such channels from each of the receiver branch signals is unnecessary.

Conversely, some channels in the received composite signal, such as high-rate packet data channels, dedicated or multi-cast, may be based on an MCS that trades robustness in favor of higher bit rates. Channels of that type thus may benefit (or even require) the diversity gains achieved through despreading the same channelization code across multiple receiver branch signals. Therefore, in at least one embodiment taught herein, the second mode of operation comprises despreading one or more channelization codes of interest from the branch combination signal, and despreading remaining ones of the channelization codes of interest from each of the receiver branch signals.

Figure 3:
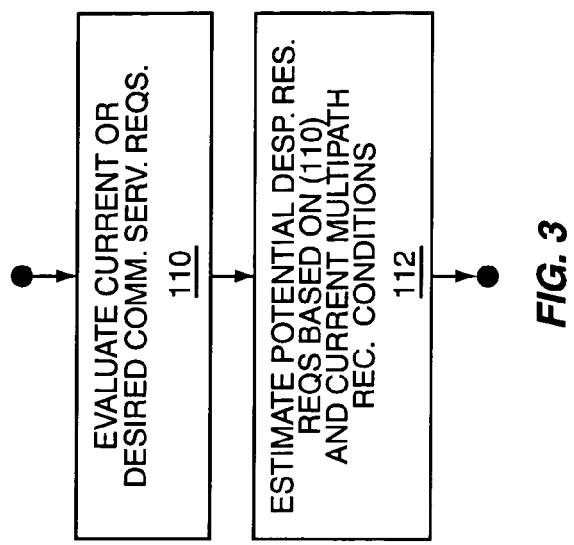
FIG. 3 is a logic flow diagram of one embodiment of processing logic supporting despreading resource mode control.

Thus, one aspect of the communication receiver's operation is determining whether to operate in the first or second mode. FIG. 3 illustrates processing logic that can be embodied in or by the mode control circuit 26 for such determinations. In operation, the mode control circuit 26 can dynamically switch operation of the processing circuits 18 between the first and second modes as needed or desired. According to the illustrated processing logic, the mode control circuit 26 makes the determination based on evaluating current or desired communication service requirements (Step 110), and then estimating the potential need for despreader resources in light of those requirements, and in view of the current multipath reception conditions (Step 112).

In the above context, those skilled in the art will recognize that the current or desired communication service requirements bear directly on the number of despreader resources needed—i.e., more concurrently active communication services, or communication services that involve a higher number of channels, such as multi-coded high-rate shared channels, require the communication receiver 10 to despread a greater number of channelization codes. However, the current communication service requirements merely establish what might be considered a baseline for the number of despreader resources needed. Other factors, e.g., multiplicative factors also come into play.

For example, the need to support soft handoff, where the communication receiver 10 receives the same downlink signal on the same channelization codes from two or more network base stations. As another example, when despreading the individual receiver branch signals, different despreader resources for each code channel of interest typically are assigned to each multipath component of interest in the receiver branch signal. Further, the communication receiver 10 may consider the possibility of soft handoff, wherein it is obligated to despread the same codes from two or more network base stations Because the multipath reception conditions can and do change frequently in mobile communication environments, one or more embodiments of mode determination processing perform a new operating mode determination at a rate commensurate with the rate at which the receiver's characterization of multipath reception conditions is updated. To that end, the communication receiver 10 generally includes channel estimation circuitry—not illustrated thus far—configured to identify at least the dominant multipath components of each receiver branch signal. For example, the communication receiver 10 may perform path searching for each antenna-received signal (i.e., each receiver branch signal) and generate a corresponding Power Delay Profile (PDP), which identifies the dominant multipath delays. PDPs may be updated ten to twenty times per second, for example, and the operating mode determination may be performed at the same or lesser rate.

Broadly, then, the communication receiver 10 can be configured to determine whether to operate in the first or second mode based on estimating despreader resource requirements potentially needed for supporting operation in the first mode. In one particular embodiment, the mode control circuit 26 evaluates current or desired communication service requirements bearing on the number of channelization codes of interest, and evaluates multipath reception conditions, to estimate potential despreader resource requirements. In another embodiment, the mode control circuit 26 dynamically estimates the potential number or amount of despreader resources 22 needed to operate in the first mode. Such estimation is based on evaluating PDPs determined for one or more of the receiver branch signals in conjunction with evaluating current or desired communication service requirements bearing on the number of channelization codes of interest.

Thus, estimating the potential need for despreader resources can consider the varying or maximum number of code channels involved in the communication service types being supported, the number of soft handoff links that may need to be supported, and the characterized multipath reception conditions. Of course, the communication receiver 10 can be configured to add in a margin to such estimations, thereby biasing it towards operation in the second mode during times when the risk of running out of despreader resources 22 in the first mode is significant.

However, those skilled in the art will also recognize the opportunity for "tuning" the first/second mode decision differently, for different types of communication networks, or even configuring the communication receiver 10 to alter dynamically its sufficient/insufficient determination threshold, or to vary during operation how conservatively it performs the estimation of potential despreader resource requirements. As one example of this, the communication receiver 10 could change between average, nominal, and worst-case values in estimating the number of soft handoff links that may need to be supported and/or in estimating the number of channelization codes that may be used in conjunction with communication services being supported.

Turning to other aspects of the methods and apparatus taught herein, in one or more embodiments, the communication receiver 10 comprises a wireless communication device that is configured for operation in wireless communication network, or is included within such a device. In one or more particular embodiments, the communication receiver 10 is configured for operation within a Wideband Code Division Multiple Access (WCDMA) network. In such embodiments, the communication receiver 10 may be particularly configured as a multi-branch Generalized RAKE (GRAKE) receiver. (However, those skilled in the art will recognize that GRAKE embodiments are non-limiting examples.)

The various and sundry details of GRAKE receiver operation are not necessary to understanding the management of despreader resources as taught herein, and the interest reader will find detailed GRAKE examples and supporting discussions in U.S. Pat. No. 6,975,672 to Bottomley, et al., which is incorporated herein by reference. In broad terms, GRAKE receivers incorporate knowledge of the impairment correlations across a given set of RAKE fingers into the combining weights used to combine the despread values from that set of fingers. In other words, GRAKE receivers cancel (or at least reduce) colored interference by estimating the correlation of received signal impairments in the despread values. To this end, GRAKE receivers maintain an estimate of received signal impairment correlations, usually in the form of an impairment covariance matrix, which may be determined directly or parametrically.

In at least one GRAKE receiver embodiment of the communication receiver 10, operating in the first mode comprises despreading each channelization code of interest from each receiver branch signal using Generalized RAKE detection. Such operation is partially illustrated in FIG. 4 by way of non-limiting example, wherein a set 30 of despreading fingers is allocated to despreading a given one of the channelization codes of interest (code "i") from receiver branch signal $Y_1$, which corresponds to the received composite signal incoming on a first one of the receiver antennas 14 (e.g., Antenna 1). Finger combining circuits 32 perform combining for the despread values obtained for channelization code i. Likewise, another set 34 of despreading fingers is allocated to despreading the same channelization code i from a second receiver branch signal $Y_2$, and additional combining circuits 36 combine the corresponding despread values.

Figure 5:
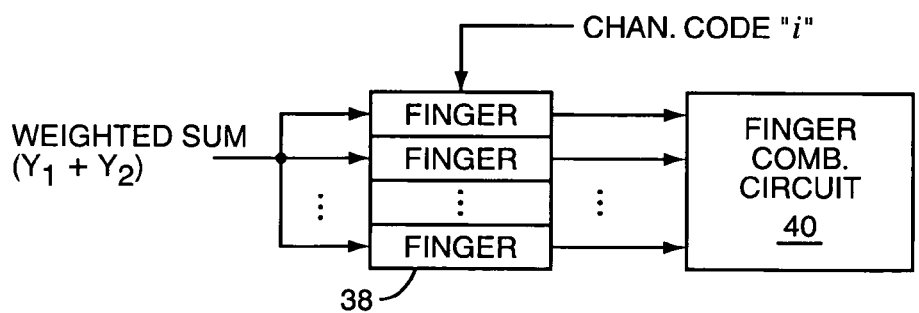

Conversely, FIG. 5 illustrates the processing of channelization code i in the second mode of operation, wherein a branch combination signal is formed as a weighted sum of the receiver branch signals $Y_1$ and $Y_2$, and the branch combination signal is then despread with respect to channelization code i, using a set 38 of despreading fingers and combining circuits 40. More generally, operating in the second mode comprises despreading one or more of the channelization codes of interest from the branch combination signal using Generalized RAKE detection, rather than from each of the individual receiver branch signals.

One sees from these simplified illustrations that despreading a given channelization code of interest from the branch combination signal rather than from the individual receiver branch signals saves despreader resources. Also, in appreciating this example, the reader should note that sets 30, 34, and 38 of finger despreaders, and that finger combining circuits 32, 36, and 40, all may represent interchangeable receiver resources, wherein the use of different reference numbers indicates the different code/signal assignments. Further, the reader should note that no attempt is made to illustrate pilot channel despreading, probing finger operations, finger combining weight generation, and various other aspects of GRAKE receiver operation carried out in actual implementations.

Figure 4:
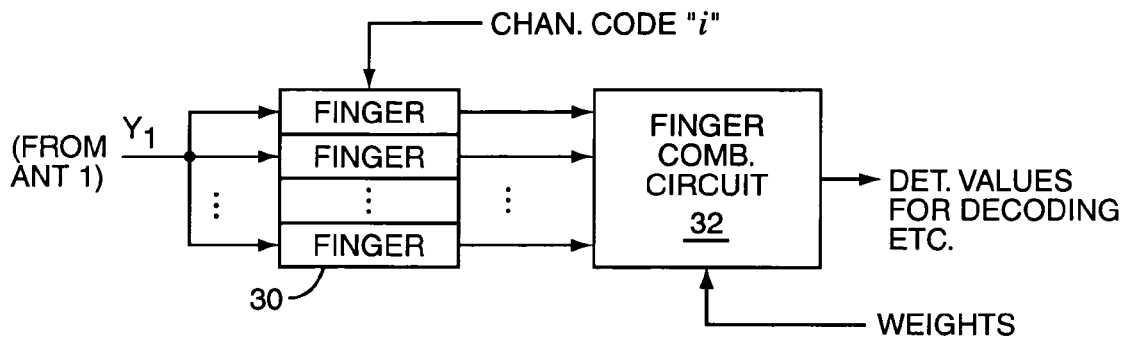
FIGS. 4 and 5 are block diagrams of one embodiment of despreader resources in first and second modes of operation, respectively, for a given channelization code.
Figure 4:
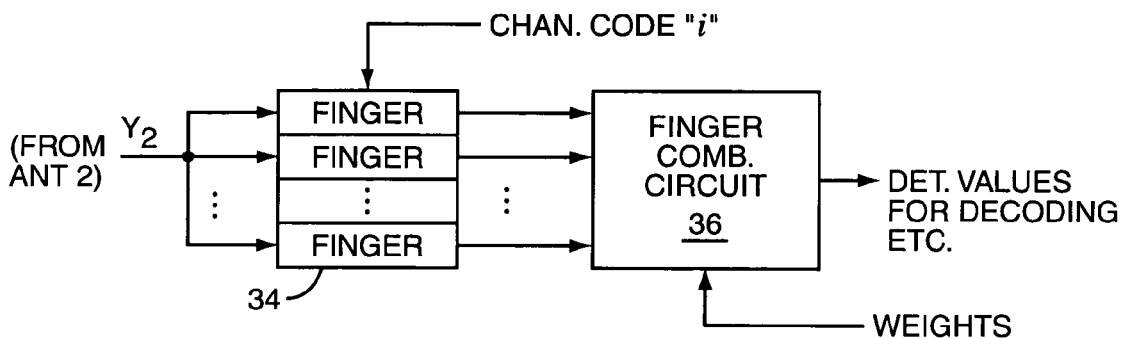
Figure 6:
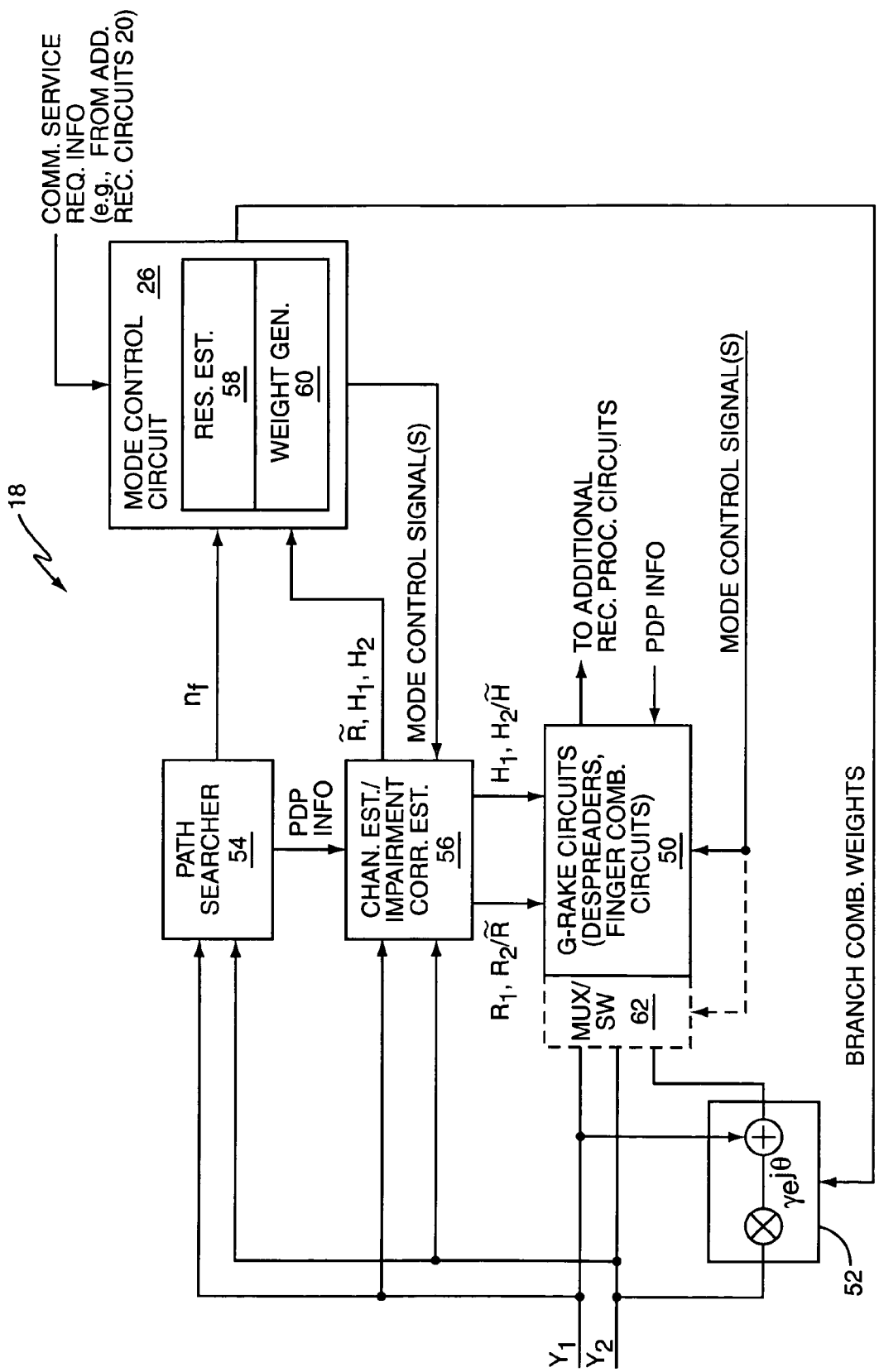
FIG. 6 is a block diagram of one embodiment of one or more processing circuits, for use in received signal despreading according to one or more method embodiments taught herein.

With the variations in despreader resource assignments given in FIGS. 4 and 5 in mind, FIG. 6 illustrates a GRAKE receiver circuit embodiment of the communication receiver 10. More particularly, FIG. 6 illustrates a GRAKE receiver circuit embodiment of the one or more processing circuits 18, wherein they comprise GRAKE circuits 50 (e.g., despreading fingers, finger combining circuits, finger weight generators, etc.), a branch signal combining circuit 52, a path searcher 54, a channel estimation/impairment correlation estimation circuit 56, a despreader resource requirement estimation circuit 58, and a branch signal combining weight generation circuit 60.

These later two circuits 58 and 60 may be considered as logically comprising all or part of the mode control circuit 26, while the branch signal combining circuit 52, path searcher 54, estimation circuit 56, along with various elements within the GRAKE circuits 50, may be considered as logically comprising all or part of the earlier illustrated supporting circuits 24. Further in keeping with the earlier illustrations (e.g., FIG. 1), the despreading fingers included within the GRAKE circuits 50 may be considered as logically comprising all or part of the despreading resources 22. Also, the reader should keep in mind that the GRAKE circuits 50 include combining weight generators that calculate finger combining weights based on channel estimates and impairment correlation estimates, but such combining circuits and corresponding combining weights should not be confused with the branch signal combining circuit 52 and the corresponding branch combining weights used by it. As noted, the branch combining weights are used to form the branch signal as a weighted sum of the individual receiver branch signals included within it.

By way of a detailed but non-limiting explanation of relevant signal processing as set within the context of FIG. 6, one sees from FIG. 6 that both antenna branches—receiver branch signals $Y_1$ and $Y_2$—are filtered, amplified, and down-converted as needed to provide baseband receiver branch signals as inputs to the path searcher 54. In turn, the path searcher 54 estimates the PDP of each receiver branch signal, and may do so on a regular basis, say 10 or 20 times per second. The path searcher 54 uses the PDP information to determine the number of despreading fingers $n_f$ needed for multipath reception with respect to each receiver branch signal. The number of despreading fingers needed for multipath processing commonly is greater than the number of multipath delays of interest, because of the use of off-path probing fingers that will be placed in or around the delay paths of interest for impairment correlation estimation.

Thus, the mode control circuit 26 receives multipath delay information for each receiver branch signal, or, for each such signal, otherwise receives a numerical value representing the actual or estimated number of despreading fingers needed to perform GRAKE detection on one or more given channelization code of interest, given current multipath conditions. Additionally, the mode control circuit 26 receives communication service requirements information for current or desired communication services. Such information may identify the type or number of communication services being supported by the communication receiver 10, or may identify the total number of channelization codes actually or potentially of interest to the communication receiver 10, given the nature and extent of its ongoing communication services and the number of particular control and data channels involved in such services. An evaluation circuit, e.g., the despreader resource requirement estimation circuit 58 previously discussed, is functionally included in the mode control circuit 26, and uses such information to generate (and maintain/update) an estimate of the potential amount or number of despreader resources 22 needed for operating in the first mode—i.e., the amount or number needed to perform GRAKE detection on all channelization codes of interest in each of the receiver branch signals.

The PDP information also feeds into the estimation circuit 56, which performs channel estimation for each receiver branch signal, generally using despread pilot symbols received via a Common Pilot Channel (CPICH) included in each such signal. Thus, the estimation circuit 56 generates channel estimates $H_1$ and $H_2$, respectively corresponding to receiver branch signals $Y_1$ and $Y_2$. Each such channel estimate may comprise a vector of dimensions $n_f \times 1$.

Further, the estimation circuit 56 generates impairment correlation estimates for each receiver branch signal. Such estimates can be generated as impairment covariance matrices $R_1$ and $R_2$, respectively corresponding to receiver branch signals $Y_1$ and $Y_2$, and each of dimension $2n_f \times 2n_f$. As earlier noted, such impairment correlation estimates may be made directly, such as by measuring impairment correlations on despread pilot values, and/or by measuring impairment correlations from chip-spaced samples of the incoming baseband receiver branch signals. Alternatively, the impairments may be modeled and parametrically generated in the communication receiver 10 based on the model terms and ongoing received signal measurements.

Regardless, the mode control circuit 26 uses the multipath information and the communication service requirement information as its basis for determining whether to operate the GRAKE circuits 50, and any involved supporting circuits, in the first mode with respect to all channelization codes of interest, or in the second mode with respect to at least one of those channelization codes of interest. In one or more embodiments, one aspect of operation in the second mode is maximizing the signal quality of the branch combination signal, which can be formed as, $$Y_{comb} = Y_1 + \gamma_{opt} e^{j\theta_{opt}} Y_2 \quad \text{Eq. (1)}$$

where $Y_1$ and $Y_2$ are, as noted earlier, the receiver branch signals in digital baseband form, and $\gamma_{opt}$ and $e^{j\theta_{opt}}$ are the amplitude and phase components of a complex weighting applied to the signal $Y_2$ as part of forming the branch combination signal $Y_{comb}$ as a weighted sum of the receiver branch signals.

That is, one or more embodiments of the processing circuits 18 are configured to determine the one or more branch weighting values as complex weighting values that maximize a signal quality of the branch combination signal. To do so, the branch weight generation circuit 60 within the mode control circuit 26 can be configured to determine the amplitude and phase components of the one or more branch weighting values according to an algorithm that maximizes the signal quality of branch combination signal.

To continue with an explanation of the signal processing differences between operation in the first and second modes, it is helpful to define the received, despread signal per channelization code at time lag j for antenna i and symbol k as, $$z_k^{ji} = h_j^i s_k + n_k^{ji}, \, i=1, 2, j=1, \ldots, n_f \quad \text{Eq. (2)}$$

where $s_k$ is the nominal signal sample for the k th symbol, the channel vector $H_i = [h_1^i, \ldots h_{n_f}^i]^H$, $H=[H_1; H_2]$, the received signal vector $Z_i = [z_k^{1i}, \ldots, z_k^{n_f i}]$ and $Z=[Z_1; Z_2]$, and the noise vector $N_i = [n_1^i, \ldots, n_{n_f}^i]^H$ and $N=[N_1; N_2]$. (Note that the superscript "H" indicates the Hermitian transpose.) Of course, those skilled in the art will recognize that the range of index i will change with the number of involved receiver branch signals.

With the above notation and corresponding signals in mind, the GRAKE detection statistic for the receiver branch signals can be written as, $$D_{GRAKE} = H^H R^{-1} Z \quad \text{Eq. (3)}$$

where the GRAKE impairment covariance matrix R can be determined according to an expected value calculation given as $R=E(NN^H)$. Further, signal quality in terms of signal-to-noise ratio (SNR) can be expressed as, $$SNR_{GRAKE} = H^H R^{-1} H \quad \text{Eq. (4)}$$

Recasting the above terms in the context of the branch combination signal can be understood in the following terms, $$\tilde{Z}(\theta,\gamma) = Z_1 + \gamma e^{j\theta} Z_2 \quad \text{Eq. (5)}$$

$$\tilde{H}(\theta,\gamma) = H_1 + \gamma e^{j\theta} H_2 \quad \text{Eq. (6)}$$

$$\tilde{N}(\theta,\gamma) = N_1 + \gamma e^{j\theta} N_2 \quad \text{Eq. (7)}$$

where the term $\gamma e^{j\theta}$ operates as a branch combining weight that can be determined in a manner that, for example, optimizes an SNR. Continuing from the above equations, a corresponding impairment covariance matrix may be expressed for $\tilde{N}$ as, $$\tilde{R} = E(\tilde{N}\tilde{N}^H) \quad \text{Eq. (8)}$$

Considering these equations, one may express the GRAKE detector statistic for the branch combination signal as a function of the amplitude and phase components of the complex branch weighting value(s), Eq. $\quad D_{GRAKE(\gamma,\theta)} = \tilde{H}^H(\gamma,\theta) \tilde{R}^{-1}(\gamma,\theta) \tilde{Z}(\gamma,\theta) \quad (9)$ Eq. (9) yields an SNR for the branch combination signal as, $$SNR_{GRAKE(\gamma,\theta)} = \tilde{H}^H(\gamma,\theta)\tilde{R}^{-1}(\gamma,\theta)\tilde{H}(\gamma,\theta) \quad \text{Eq. (10)}$$

In the interest of implementation simplicity and/or computational efficiency of determining optimal branch weighting values for maximizing the SNR, the mode control circuit 26 is configured to use quantized or range-constrained values. For example, in one embodiment, the branch weight generation circuit 60 is configured to use quantized values for the phase and amplitude components ($\gamma,\theta$) of the weighting values, thereby simplifying a maximization algorithm that is used to determine the weighting values that maximize the signal quality of the branch combination signal.

In one embodiment, the branch weight generation circuit 60 is configured to optimize the values of $\gamma$ and $\theta$ used by the branch combination circuit 52 to form $Y_{comb}$ as $Y_1 + \gamma_{opt} e^{j\theta_{opt}} Y_2$. Such optimization can be based on a maximization algorithm that maximizes signal quality as, $$(\gamma_{opt}, \theta_{opt}) = \arg\max_{\gamma,\theta} \tilde{H}^H(\gamma,\theta)\tilde{R}^{-1}(\gamma,\theta)\tilde{H}(\gamma,\theta) \quad \text{Eq. (11)}$$

In other words, the amplitude and phase values of the branch weight(s) that maximize SNR of the branch combination signal are determined. As an example of using quantized values in the optimization, the amplitude component can be represented in quantized form as (0.1, 1, 10), and the phase component can be represented in quantized form as (0, 90, 180, 270) degrees.

In one or more embodiments, the mode control circuit 26 is configured to use one period of time to carry out the signal quality calculations and optimum weighting value calculations, and applies the determined branch weighting value(s) in a next period of time. Such time periods may be regularly repeating slots synchronized with frames or other received signal intervals. Thus, if the mode control circuit 26 determines that it should use the second mode of operation for one or more of the channelization codes of interest, it can maintain dynamically updated branch combining weights, as well as dynamically revisiting the determination to operate in the second mode, as a function of changing multipath conditions and/or changing communication requirements.

Figure 7:
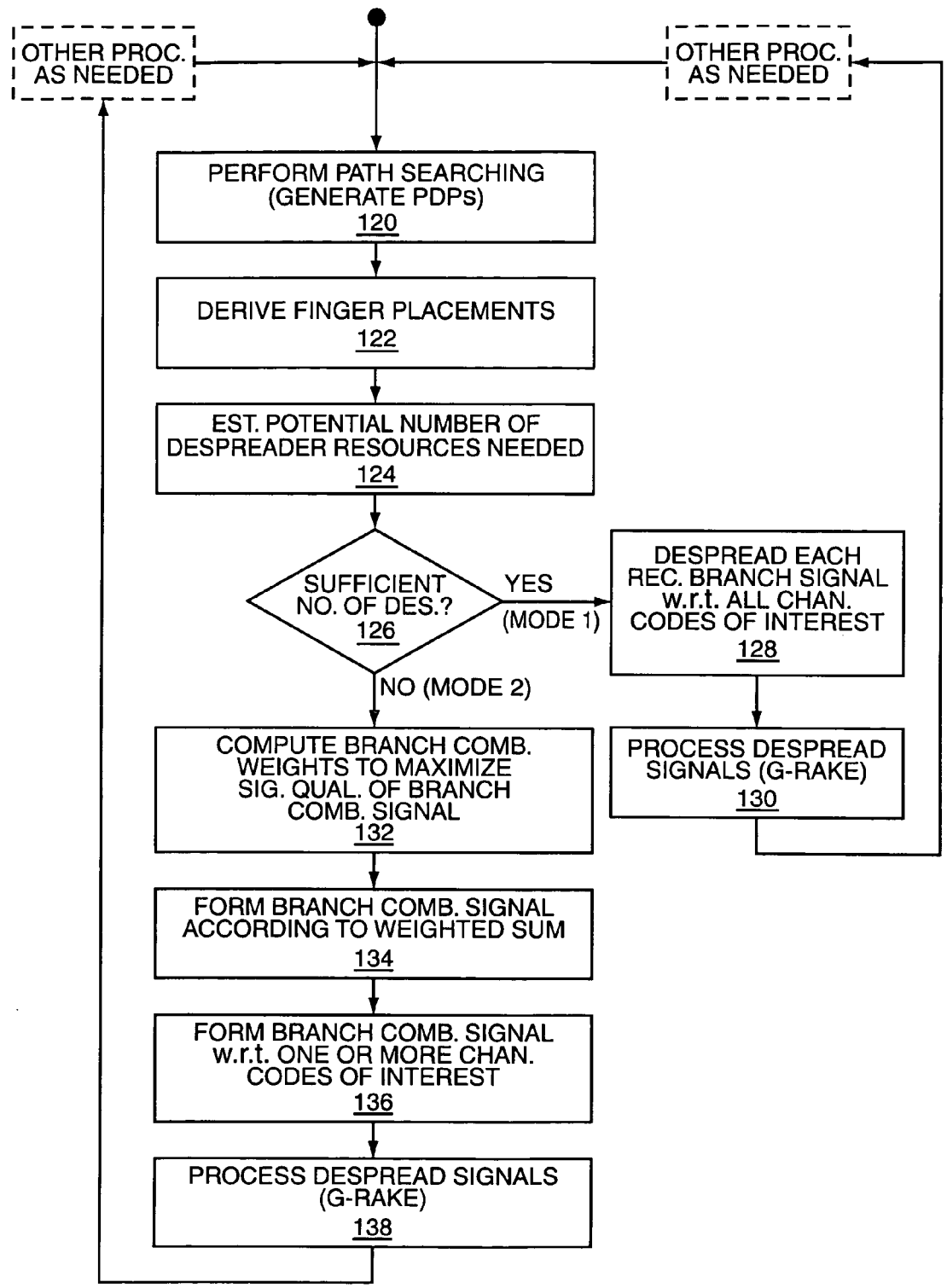
FIG. 7 is a logic flow diagram of one embodiment of processing logic for managing despreader resources according to first and second modes in a Generalized RAKE receiver embodiment of the communication receiver of FIG. 1, for example.

Indeed, FIG. 7 illustrates processing logic for one embodiment of overall signal processing in the GRAKE context, wherein processing begins with the path searcher 54 determining PDPs for the receiver branch signals on a regular or as needed basis (Step 120). The path searcher 54 may include a finger placement processor to determine RAKE finger placements, i.e., the despreader delay alignments, based on the PDP information (Step 122), and the mode control circuit 26 estimates the number of potential channelization codes that the communication receiver 10 must be able to despread (Step 124), based on multipath information from the path searcher 54 and on communication service requirement information from the additional receiver circuits 20, first illustrated in FIG. 1. Such circuits may comprise decoders, user interface elements, and the like, and may particularly include a system-level controller that determines or identifies the communication service requirements.

In any case, processing continues with the mode control circuit 26 determining whether the available despreader resources 22 within the GRAKE circuits 50 are sufficient given its estimation of the potential despreader requirements (Step 126). If so, the mode control circuit 26 configures the GRAKE circuits 50 to despread each receiver branch signal with respect to all channelization codes of interest (Step 128)—i.e., to perform GRAKE detection on all channelization codes of interest for each receiver branch signal—and to process the resulting despread signals accordingly (Step 130). Other processing tasks may be carried out subsequently, or in parallel, as needed or desired.

Conversely, if the available despreader resources 22 are not sufficient to support the potential number or amount of despreading resources needed for operating in the first mode, processing continues with computing branch combining weights (Step 132). As explained, the branch combining weights support forming the branch combination signal as a weighted sum of two or more of the receiver branch signals, but not necessarily all such branch signals existing within the communication receiver 10.

Of course, the branch combining weights may be been calculated in a prior calculation interval and thus be available for use in the current interval. Thus, the processing of Step 132 can be understood as computing branch combining weights for the current interval, or for a next interval. In any case, in one or more particular embodiments, the branch combining weights are computed in a manner that maximizes the signal quality of the combined branch signal.

Regardless, with currently or previously calculated branch combining weights available, processing continues with forming the branch combination signal as a weighted sum of the involved receiver branch signals (Step 134). To this end, the mode calculation circuit 26 may be configured to calculate the branch combining weights and provide them to the branch combining circuit 52 shown in FIG. 6, for example, for use in branch signal combining. The branch combining circuit 52 may include a multiplier for applying the weighting values as scaling factors, and a summing circuit, for combining the (weighted) branch signals.

Processing continues with despreading the branch combination signal with respect to (w.r.t.) one or more of the channelization codes of interest (Step 136), and the despread values thereby obtained are processed in the GRAKE circuits 50 (Step 138). Note that a multiplexer and/or switch circuit 62 may precede the GRAKE circuits 50 in some embodiments. In an embodiment where the GRAKE circuits 50 are operated either in the first or second mode with respect to all channelization codes of interest, the mux/switch 62 provides either the individual receiver branch signals to the GRAKE circuits 50, or provides the branch combination signal to the GRAKE circuits 50. The mux/switch 62 may operate responsive to a mode control signal from the mode control circuit 26. Of course, in some embodiments, one or more channelization codes of interest are despread from the individual receiver branch signals according to the first mode of operation, and one or more of the channelization codes of interest are despread from the branch combination signal according to the second mode of operation. In such embodiments, the GRAKE circuits 50 receive the individual receiver branch signals and the branch combination signal, and despreader resources are internally allocated within the GRAKE circuits 50 as appropriate.

Of course, the present invention is not limited by the foregoing discussion, nor is it limited by the accompanying drawings. Indeed, the present invention is limited only by the following claims, and their legal equivalents.

What is claimed is:

1. A method of despreading two or more receiver branch signals in a communication receiver comprising:
    in a first mode of operation, despreading all channelization codes of interest from each of the two or more receiver branch signals;

in a second mode of operation, despreading one or more of the channelization codes of interest from a branch combination signal formed from a combination of two or more receiver branch signals, rather than from each receiver branch signal;

estimating despreader resource requirements potentially needed for supporting operation in the first mode by evaluating current or desired communication service requirements bearing on the number of channelization codes of interest, and evaluating multipath reception conditions; and determining whether to operate in the first or second mode based on an assessment of whether despreader resources available in the communication receiver are sufficient to support operation in the first mode.

2. The method of claim 1, wherein evaluating multipath reception conditions comprises dynamically estimating a potential number or amount of despreader resources needed to operate in the first mode based on evaluating Power Delay Profiles (PDPs) determined for one or more of the receiver branch signals.

3. The method of claim 1, wherein the communication receiver comprises a multi-branch communication receiver included within a wireless communication device configured for operation in a Wideband Code Division Multiple Access (WCDMA) network.

4. The method of claim 1, wherein the communication receiver comprises a multi-branch Generalized RAKE receiver.

5. The method of claim 4, wherein operating in the first mode comprises despreading each channelization code of interest from each receiver branch signal using Generalized RAKE detection, and wherein operating in the second mode comprises despreading one or more of the channelization codes of interest from the branch combination signal using Generalized RAKE detection, rather than from each of the individual receiver branch signals.

6. The method of claim 1, further comprising forming the branch combination signal as a weighted sum of two or more receiver branch signals.

7. The method of claim 6, wherein forming the branch combination signal as a weighted sum of two or more receiver branch signals comprises combining the receiver branch signals included in the branch combination signal according to one or more weighting values.

8. The method of claim 7, further comprising determining the one or more weighting values according to an algorithm that maximizes a signal quality of the branch combination signal.

9. The method of claim 6, wherein forming the branch combination signal as a weighted sum of two or more receiver branch signals comprises determining one or more complex weighting values, each having phase and amplitude components, that maximize a signal quality of the branch combination signal.

10. The method of claim 9, further comprising using quantized values for the phase and amplitude components of the weighting values, to thereby simplify a maximization algorithm being used to determine the weighting values that maximize the signal quality of the branch combination signal.

11. A multi-branch communication receiver comprising one or more processing circuits configured to:

in a first mode of operation, despread all channelization codes of interest from each of two or more receiver branch signals;

in a second mode of operation, despread one or more of the channelization codes of interest from a branch combination signal formed from a combination of two or more receiver branch signals, rather than from each receiver branch signal;

estimate despreader resource requirements potentially needed for supporting operation in the first mode by evaluating current or desired communication service requirements bearing on the number of channelization codes of interest, and evaluating multipath reception conditions; and determine whether to operate in the first or second mode based on an assessment of whether despreader resources available in the communication receiver are sufficient to support operation in the first mode.

12. The multi-branch communication receiver of claim 11, wherein the one or more processing circuits are configured to evaluate multipath reception conditions as indicated by one or more Power Delay Profiles (PDPs) determined for one or more of the receiver branch signals.

13. The multi-branch communication receiver of claim 11, wherein the communication receiver comprises a multi-branch communication receiver included within a wireless communication device configured for operation in a Wideband Code Division Multiple Access (WCDMA) network.

14. The multi-branch communication receiver of claim 11, wherein the communication receiver comprises a multi-branch Generalized RAKE receiver, and wherein the one or more processing circuits include a mode control circuit and Generalized RAKE receiver circuits.

15. The multi-branch communication receiver of claim 14, wherein the mode control circuit is configured to operate the Generalized RAKE receiver circuits in the first mode by despreading each channelization code of interest from each receiver branch signal using Generalized RAKE detection, and further configured to operate all or a portion of the Generalized RAKE receiver circuits in the second mode by despreading one or more of the channelization codes of interest from the branch combination signal using Generalized RAKE detection, rather than from each of the receiver branch signals.

16. The multi-branch communication receiver of claim 11, wherein the one or more processing circuits include a branch signal combining circuit configured to form the branch combination signal as a weighted sum of two or more receiver branch signals.

17. The multi-branch communication receiver of claim 16, wherein the branch combining circuit is configured to form the branch combination signals by combining the receiver branch signals included in the branch combination signal according to one or more weighting values.

18. The multi-branch communication receiver of claim 17, wherein the one or more processing circuits further include a branch weight generation circuit configured to determine the one or more weighting values according to an algorithm that maximizes a signal quality of the branch combination signal.

19. The multi-branch communication receiver of claim 16, wherein the branch combining circuit is configured to determine one or more complex weighting values for forming the weighted sum, each having phase and amplitude components, that maximize a signal quality of the branch combination signal.

20. The multi-branch communication receiver of claim 19, wherein the one or more processing circuits are configured to use quantized values for the phase and amplitude components of the weighting values, to thereby simplify a maximization algorithm being used to determine the weighting values that maximize the signal quality of the branch combination signal.

21. A wireless communication device comprising two or more antennas, and the multi-branch communication receiver of claim 11.

22. A method of performing Generalized RAKE detection in a multi-branch communication receiver comprising:
- in a first mode of operation, performing Generalized RAKE detection on individual receiver branch signals, for each channelization code of interest in a plurality of channelization codes of interest;
- in a second mode of operation, performing Generalized RAKE detection on a combined branch signal formed as a weighted sum of the individual receiver branch signals, for one or more of the channelization codes of interest; and
- selecting the first or second mode of operation based on estimating a number or amount of despreader resources potentially needed for supporting the first mode of operation based on evaluating current multipath reception conditions and current or desired communication service requirements bearing on the number of channelization codes of interest.

23. A Generalized RAKE receiver circuit for use in a in a multi-branch communication receiver comprising:
- despreading and associated signal combining circuits configurable for first and second modes of operation;
- said despreading and associated signal combining circuits operative in the first mode to perform Generalized RAKE detection on individual receiver branch signals, for each channelization code of interest in a plurality of channelization codes of interest;
- said despreading and associated signal combining circuits operative in the second mode to perform Generalized RAKE detection on a branch combination signal formed as a weighted sum of the individual receiver branch signals, for one or more of the channelization codes of interest; and
- a control circuit configured to select the first or second mode of operation based on estimating a number or amount of despreader resources potentially needed for supporting the first mode of operation based on evaluating current multipath reception conditions and current or desired communication service requirements bearing on the number of channelization codes of interest.

* * * * *

UNITED STATES PATENT AND TRADEMARK OFFICE
CERTIFICATE OF CORRECTION

PATENT NO. : 7,933,314 B2  Page 1 of 1
APPLICATION NO. : 11/472770
DATED : April 26, 2011
INVENTOR(S) : Lindoff It is certified that error appears in the above-identified patent and that said Letters Patent is hereby corrected as shown below:

On Title Page 2, in Field (56), under "OTHER PUBLICATIONS", in Column 2, Line 1, delete "Signal Paper" and insert -- Signal Processing Paper --, therefor.

In Column 10, Line 67, in Equation (9), delete

" Eq. $D_{GRAKE(\gamma,\theta)} = \tilde{H}^H(\gamma,\theta)\tilde{R}^{-1}(\gamma,\theta)\tilde{Z}(\gamma,\theta)$ (9)," and insert -- $D_{GRAKE(\gamma,\theta)} = \tilde{H}^H(\gamma,\theta)\tilde{R}^{-1}(\gamma,\theta)\tilde{Z}(\gamma,\theta)$     Eq. (9) --, therefor.

In Column 16, Line 1, in Claim 23, delete "in a in a" and insert -- in a --, therefor.

Signed and Sealed this
Eighth Day of November, 2011

David J. Kappos
*Director of the United States Patent and Trademark Office*